(No Model.) 2 Sheets—Sheet 1.

T. J. CATHEY.
CORN OR COTTON PLANTER.

No. 401,132. Patented Apr. 9, 1889.

Witnesses.
W. B. Harris.
Arthur S. Bryant.

Inventor,
Thomas J. Cathey
By his Attorneys
Redson Bro's.

(No Model.) 2 Sheets—Sheet 2.

T. J. CATHEY.
CORN OR COTTON PLANTER.

No. 401,132. Patented Apr. 9, 1889.

Witnesses.
M. B. Harris
Arthur L. Bryant

Inventor,
Thomas J. Cathey
By his Attorneys
Edson Bro's.

UNITED STATES PATENT OFFICE.

THOMAS JEFFERSON CATHEY, OF HUBBARD, TEXAS.

CORN AND COTTON PLANTER.

SPECIFICATION forming part of Letters Patent No. 401,132, dated April 9, 1889.

Application filed October 16, 1888. Serial No. 288,210. (No model.)

*To all whom it may concern:*

Be it known that I, THOMAS JEFFERSON CATHEY, a citizen of the United States, residing at Hubbard, in the county of Hill and State of Texas, have invented certain new and useful Improvements in Corn and Cotton Planters; and I do hereby declare the following to be a full, clear, and exact description of the invention, such as will enable others skilled in the art to which it appertains to make and use the same.

My invention relates to improvements in corn and cotton planters; and it consists of the novel combination of devices and peculiar construction and arrangement of parts, as will be hereinafter fully described, and particularly pointed out in the claims.

One of the objects of my invention is to provide a novel planting mechanism for planting either corn or cotton-seed, at the pleasure of the operator, by a simple adjustment of parts, and thereby adapt the machine for sowing different kinds of seeds and save the farmer the expense of two different machines.

A further object of my invention is to provide mechanism which can be adjusted to rows of different widths, to provide for readily raising the furrow-openers out of the ground to clear stones and other obstructions, and for throwing the planting mechanism out of gear with the driving-shaft, all as will be more fully described hereinafter.

Figure 1:
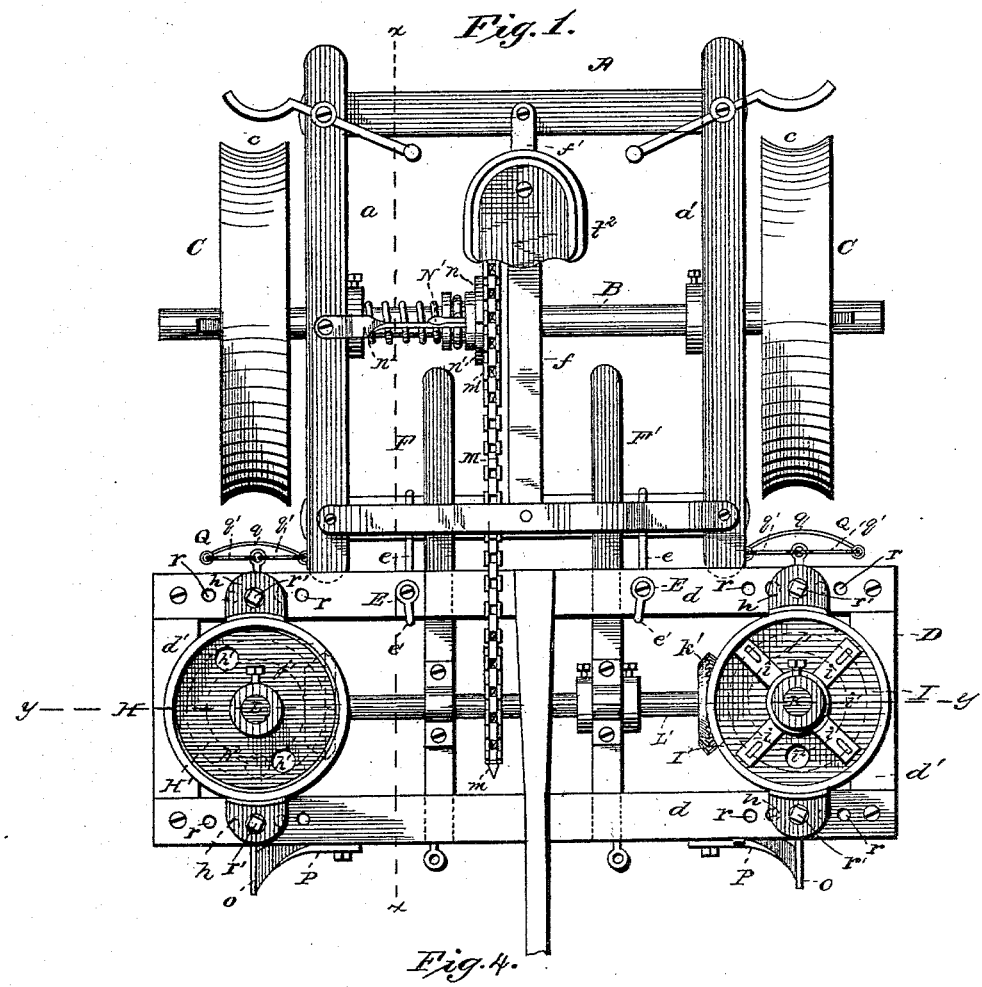
Figure 2:
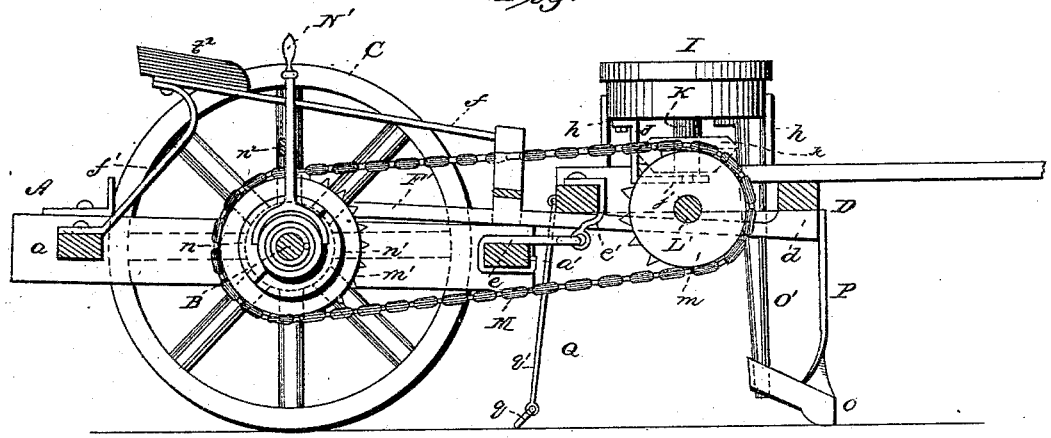
Figure 3:
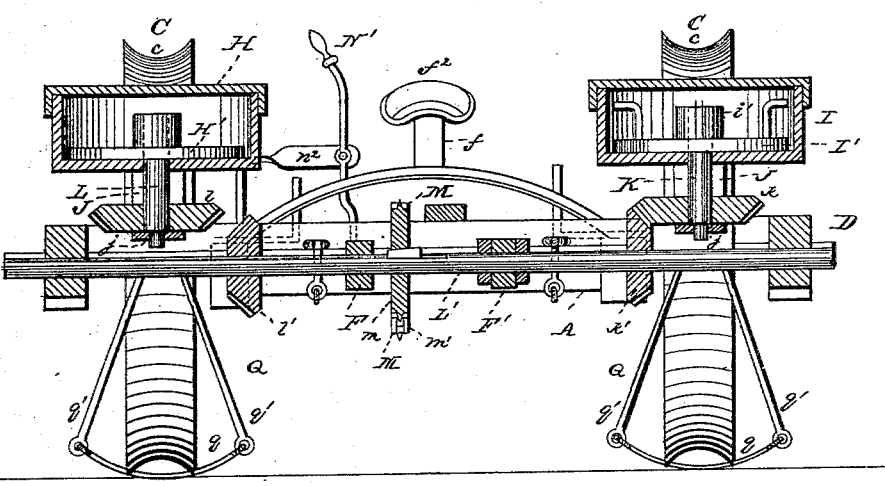

In the accompanying drawings, Figure 1 is a plan view of a corn and cotton planter embodying my invention. Fig. 2 is a longitudinal sectional view of the machine on the line $x\,x$ of Fig. 1. Fig. 3 is a vertical transverse sectional view of the machine through the planting mechanism on the line $y\,y$ of Fig. 1, and Fig. 4 is an enlarged detail view of one of the seed boxes or receptacles and the means for supporting the same.

Referring to the drawings, in which like letters of reference denote corresponding parts in all the figures, A designates the main carrying-frame, which comprises the beams $a\,a'$, that are suitably secured together, and B the axle, journaled in bearings on said frame and having the bearing-wheels C. These wheels are keyed to the axle to rotate therewith, and so that they can be moved longitudinally on the axle to adapt themselves to rows of different widths, said wheels each having a circumferential groove, $c$, as shown.

D is the adjustable frame which carries the planting mechanism, presently described. This adjustable frame consists of the transverse bars $d$ and the longitudinal bars $d'$, bolted to the bars $d$, and said adjustable frame is jointed to the front end of the carrying-frame by a peculiar hinge-joint, so that it can be raised or moved vertically. This hinge-joint is represented at E, and consists of two rods or arms, $e\,e'$, one of which is secured to the main carrying-frame and the other to the adjustable frame. There are two of these hinge-joints provided, one being arranged on each side of a central longitudinal line drawn through the machine, so that both ends of the adjustable frame will be equally raised or lowered. The arm $e'$ of the hinge-joint curves downward beneath the adjustable frame, while the arm $e$ extends forward beyond the main frame to meet the free end of the arm, said arms having eyes or loops which interlock to form the hinge-joint. This adjustable frame is arranged on a horizontal plane slightly raised above the main carrying-frame, and to said adjustable frame are secured foot bars or levers F F', which extend rearward therefrom and rest on the rear bar of the main carrying-frame. The rear ends of these foot bars or levers terminate below a seat, $t^2$, which is mounted on standards $f\,f'$, fixed to the main frame, whereby the driver occupying the seat can readily depress the foot bars and thus raise the adjustable frame.

H I designate the receptacles or boxes provided for the corn and cotton-seed. Each of these receptacles comprises a cylindrical shell and a removable cover, and they are each secured to vertical standards $h$, which are bolted to the frame D, said receptacles being arranged at opposite ends of said frame, as shown. The receptacle H is designed to receive corn and the other receptacle, I, to receive cotton-seed, and in the receptacle H' is arranged a horizontal rotary dropping-disk, H', while in the receptacle I is arranged a rotary sweep, I'. The sweep and rotary dropping-disk are differently constructed to adapt them to distribute the different classes or kinds of seed which the receptacles or hoppers contain. The rotary disk H' has two openings, $h'$, therein, of sufficient size to permit the grains of corn to pass therethrough and escape through an opening, $h^2$, formed in the bottom of the hopper or receptacle H. The rotary sweep I' has four radial arms, $i$, made integral with a central hub, $i'$, and these arms are adapted to force the cotton-seed to an opening, $i^2$, in the bottom of the hopper I, each of said radial arms $i$ being provided with a vertical L-shaped agitator for stirring the contents of the hopper I and insuring the proper feeding of the cotton-seed. This rotary wheel and sweep are adapted to be alternately driven or rotated at the will of the attendant by the same operating mechanism, which I will now describe.

Depending from the lower sides of the two hoppers or receptacles are vertical straps J, each of which has a step or bearing, $j$, in which is journaled the lower end of a vertical driving-shaft. There are two of these shafts provided, K L, one for each hopper or receptacle, and the upper end of each shaft passes through the bottom of the hopper and a central hub on the rotary disk and sweep, the latter being clamped to the shafts by means of set-screws $j'$, as shown. To the lower end of each vertical shaft is secured a bevel gear-wheel, $k$ $l$, respectively, which are adapted to alternately engage similar bevel gear-wheels, $k'$ $l'$, that are keyed to opposite ends of a horizontal shaft, L', which is journaled in suitable bearings on the adjustable frame. This shaft is capable of endwise movement or play for a limited distance in its bearings to adapt it to gear with either of the vertical shafts, but not with both of said shafts at one time, whereby either the sweep or the disk can be rotated according as it is desired to plant corn or cotton-seed. This horizontal shaft is rotated by means of a sprocket-chain, M, which passes over two sprocket-wheels, $m$ $m'$, secured, respectively, to the shaft L' and the axle B of the machine. The sprocket-wheel $m'$ is loosely mounted on the axle B, and on one face thereof is formed a clutch-section, $n$, with which is adapted to engage a similar clutch-section, $n'$, that is keyed to the axle B, to rotate therewith, and at the same time be capable of sliding back and forth thereon, whereby when the two clutch-sections are engaged the motion of the axle B will be communicated through the sprocket-wheels and chain to the shaft L', to operate either the rotary planting-disk or the rotary sweep. The sliding section of the clutch is normally forced toward and in engagement with the section $n$ thereof on the sprocket-wheel $m'$ by a coiled spring; and in order to disengage the sliding section from said sprocket-wheel I have provided a vertical operating-lever, N', which is fulcrumed to a fixed standard, $n^2$, and is arranged within easy reach of the driver occupying the seat, to enable him to readily throw the planting mechanism out of operation.

O O' are the seed-conducting tubes, which depend from the hoppers or receptacles to conduct the seed therefrom to the ground, and at their lower ends said tubes have furrow-openers $o$, said tubes being stayed by braces P, that are secured to their lower ends and bolted to the frame D at their upper ends.

From the rear side of the adjustable frame D depend drags or covers Q, which are arranged in line with the seed-tubes and are loosely suspended. Each of these drags comprises a segmental lower bar, $q$, and converging side bars, $q'$, which are properly joined to the ends of the segmental bar and to each other, as shown.

By bolting the standards which support the seed receptacles or hoppers to the adjustable frame and keying the bevel gear-wheels $k'$ $l'$ to the shaft L' the hoppers can be moved or adjusted laterally on the adjustable frame, and thereby plant either corn or cotton-seed in rows varying in distance from one another as may be desired. The seed-tubes and their braces can also be adjusted with the hoppers for the same purpose.

In order to permit the hoppers to be moved laterally on the frame, the transverse bars $d$ thereof are provided with two, three, or more apertures, $r$, at each end thereof, (see Fig. 1,) through which apertures are passed the bolts $r'$, that secure the standards $h$ and the hoppers to the frame.

The operation of my invention will be readily understood from the foregoing description, taken in connection with the drawings.

Having thus fully described my invention, what I claim as new, and desire to secure by Letters Patent, is—

1. In a corn and cotton planter, the combination of a main carrying-frame in which the axle is journaled, an adjustable frame hinged thereto and carrying two hoppers or receptacles, levers for elevating the adjustable frame, a rotary disk located in one of said hoppers, a rotary sweep located in the other hopper, vertical shafts to which said sweep and disk are secured, an endwise-movable shaft common to both of said vertical shafts and adapted to be geared at will with either of the same, and a sprocket-chain passing over sprocket-wheels fixed on the axle and the shaft for rotating the latter, substantially as described.

2. In a corn and cotton planter, the combination of the two hoppers, one having a rotary planting-disk and the other a rotary sweep, the depending straps secured to the hoppers and each having a step or bearing, the vertical shafts stepped in said bearings and having the disk and sweep secured thereto, and the shaft adapted to be geared with either of said vertical shafts, substantially as described.

3. In a corn and cotton planter, the combination of a main carrying-frame having the axle journaled therein, an adjustable frame jointed thereto, the two hoppers each mounted on standards which are bolted to said adjustable frame to detachably secure said hoppers to the adjustable frame and adapt them to be adjusted laterally thereon, the depending straps secured to said hoppers, the vertical shafts mounted in the straps and hoppers and one having a rotary planting-disk and the other a rotary sweep, a shaft having bevel gear-wheels keyed thereto and adapted to mesh with similar wheels on the vertical shafts, the seed-tubes secured to the hoppers and having braces bolted to the adjustable frames, the drags suspended from said adjustable frame, and mechanism intermediate of the axle and the shaft for rotating the latter, substantially as described.

In testimony whereof I affix my signature in presence of two witnesses.

THOMAS JEFFERSON CATHEY.

Witnesses:
H. H. WRIGHT,
J. A. JONES.